United States Patent
Yoshiura et al.

[11] Patent Number: 5,587,852
[45] Date of Patent: Dec. 24, 1996

[54] DISK HEAD DRIVING DEVICE USING LINEAR ACTIVATOR WITH MULTIPOLAR MAGNETS

[75] Inventors: Tsukasa Yoshiura, Katano; Kiyoshi Masaki, Amagasaki, both of Japan

[73] Assignee: Matsuhita Electric Industrial Co., Ltd., Osaka, Japan

[21] Appl. No.: 350,337

[22] Filed: Dec. 6, 1994

[30] Foreign Application Priority Data

Dec. 7, 1993 [JP] Japan .................................. 5-305672

[51] Int. Cl.⁶ .................................................. G11B 5/596
[52] U.S. Cl. .................................... 360/78.12; 360/77.03; 360/78.11; 310/12
[58] Field of Search ..................... 360/75, 77.02, 360/77.03, 78.11, 78.12; 310/12; 318/135, 687; 369/54

[56] References Cited

U.S. PATENT DOCUMENTS

| | | | |
|---|---|---|---|
| 5,075,583 | 12/1991 | Sakagami et al. | 310/12 |
| 5,130,583 | 7/1992 | Andoh | 310/12 |
| 5,175,455 | 12/1992 | Penicaut | 310/12 |
| 5,191,270 | 3/1993 | McCormack | 318/254 |
| 5,231,549 | 7/1993 | Morehouse et al. | 360/75 |
| 5,245,232 | 9/1993 | Nihel et al. | 310/12 |
| 5,262,907 | 11/1993 | Duffy et al. | 360/77.05 |
| 5,270,886 | 12/1993 | Nigam | 360/77.03 X |
| 5,289,088 | 2/1994 | Andoh | 318/135 |
| 5,359,245 | 10/1994 | Takel | 310/12 |

*Primary Examiner*—W. R. Young
*Assistant Examiner*—James L. Habermehl
*Attorney, Agent, or Firm*—Price, Gess & Ubell

[57] ABSTRACT

The head driving apparatus of the present invention is composed of the following units. A head-provided carriage which moves in a straight line; a plurality of coils fixed on the carriage; a multipolar magnet whose polarities are alternated along the passage for the coils; a ferromagnetic stator yoke for fixing the magnet; a position sensor for detecting a position of the carriage, and a driving circuit for generating a function signal for each coil which corresponds to a detected carriage position, based on the distribution of the magnetic flux to be formed by the multipolar magnet, and then supplies the current to the coils based on the function signal.

9 Claims, 10 Drawing Sheets

DISK HEAD DRIVING DEVICE USING LINEAR ACTIVATOR WITH MULTIPOLAR MAGNETS

BACKGROUND OF THE INVENTION (1) Field of the Invention

The present invention relates to a head driving device to be used for a flexible disk, a hard disk, or an optical disk which record or reproduce data, and especially to a head driving device provided with a linear motor.

(3) Related Art

Recently, A4 size or smaller portable personal computers and word processors have been developed. These devices are expected to be thin and light in weight, and to demand low power consumption to be used in a car or train, and also to be inexpensive.

These devices are provided with a disk to record and reproduce data, which has a head driving mechanism which allows the head to slide in the radial direction.

A popular head driving mechanism to be used in a disk for a portable PC or word processor is a voice coil type linear motor provided with a yoke, a permanent magnet, and a moving-coil.

A head driving device provided with an unipolar voice coil type linear motor having a single pole magnet is disclosed, for example, in U.S. Pat. No. 4,969,058 and Japanese Laid-open Patent Application No. 2-114845.

A head driving device provided with a multipolar voice coil type linear motor having multipolar magnets is disclosed, for example, in U.S. Pat. No. 4,669,013.

The multipolar voice coil type linear motors cause less concentration of the magnetic polarities than the unipolar voice coil type ones. As a result, magnetic saturation of a stator yoke is reduced. This contributes to the reduction in leakage flux, and as a result, a thin and light weight motor having a low power consumption can be realized.

Furthermore, Japanese Laid-open Patent Application No. 3-270670 discloses a multipolar voice coil type linear motor which can prevent irregular torque by making the dispersion of magnetic flux into a sine wave.

However, in a multipolar voice coil type linear motor, the direction of a magnetic field to be formed in the passage for the coils to move is alternated in accordance with the direction that the coils proceed. Consequently, it is necessary to detect the direction of the magnetic field as the coils proceed and to supply current in accordance with the detected direction. For this reason, the current to supply to the coils is controlled by detecting the magnetic flux by providing hole elements in the vicinity of the coil.

Figure 1:
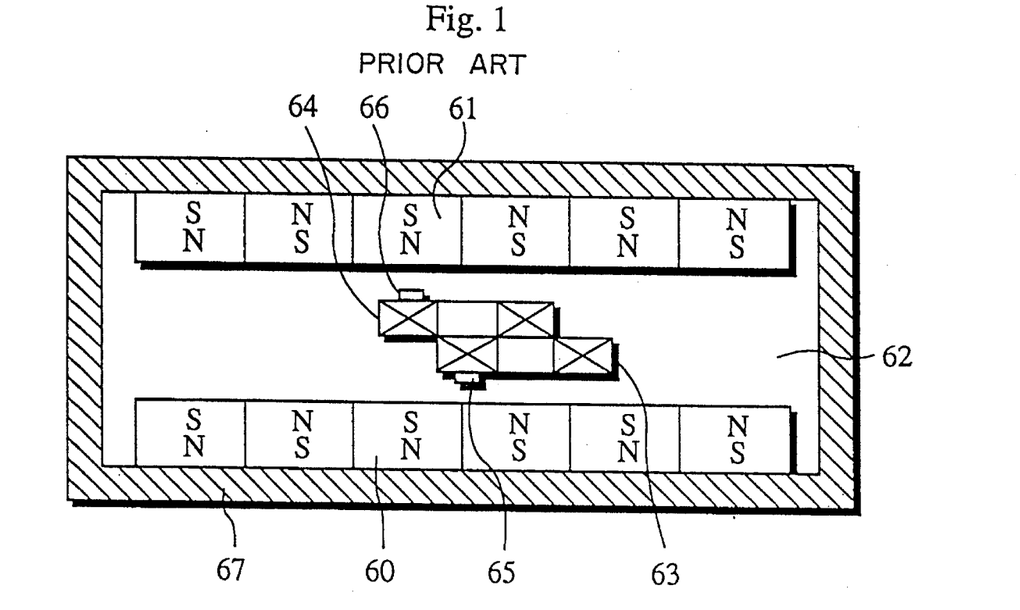
FIG. 1 shows the construction of a conventional multipolar voice coil type linear motor.

FIG. 1 shows the construction of a multipolar voice coil type linear motor having hole elements disclosed in the Japanese Laid-open Patent Application No. 2-131354.

The linear motor is provided with a pair of multipolar magnets 60 and 61 attached to the yoke 67, and first and second coils 63 and 64 which are movable through the space 62 extending between the multipolar magnets 60 and 61. The coils 63 and 64 have hole elements 65 and 66. In the space 62, the multipolar magnets 60 and 61 form a magnetic field whose direction alternates in accordance with the direction of the movement of the coils 63 and 64.

In such a linear motor, the driving force for the coils 63 and 64 is in proportion to the product between the magnetic flux of the coils 63 and 64 and the current supplied to the coils 63 and 64. Consequently, the coils 63 and 64 can be moved in the same direction by detecting the magnetic flux with the hole elements 65 and 66 and shifting the direction of the current to be supplied in accordance with the direction of the magnetic field.

Figure 2:
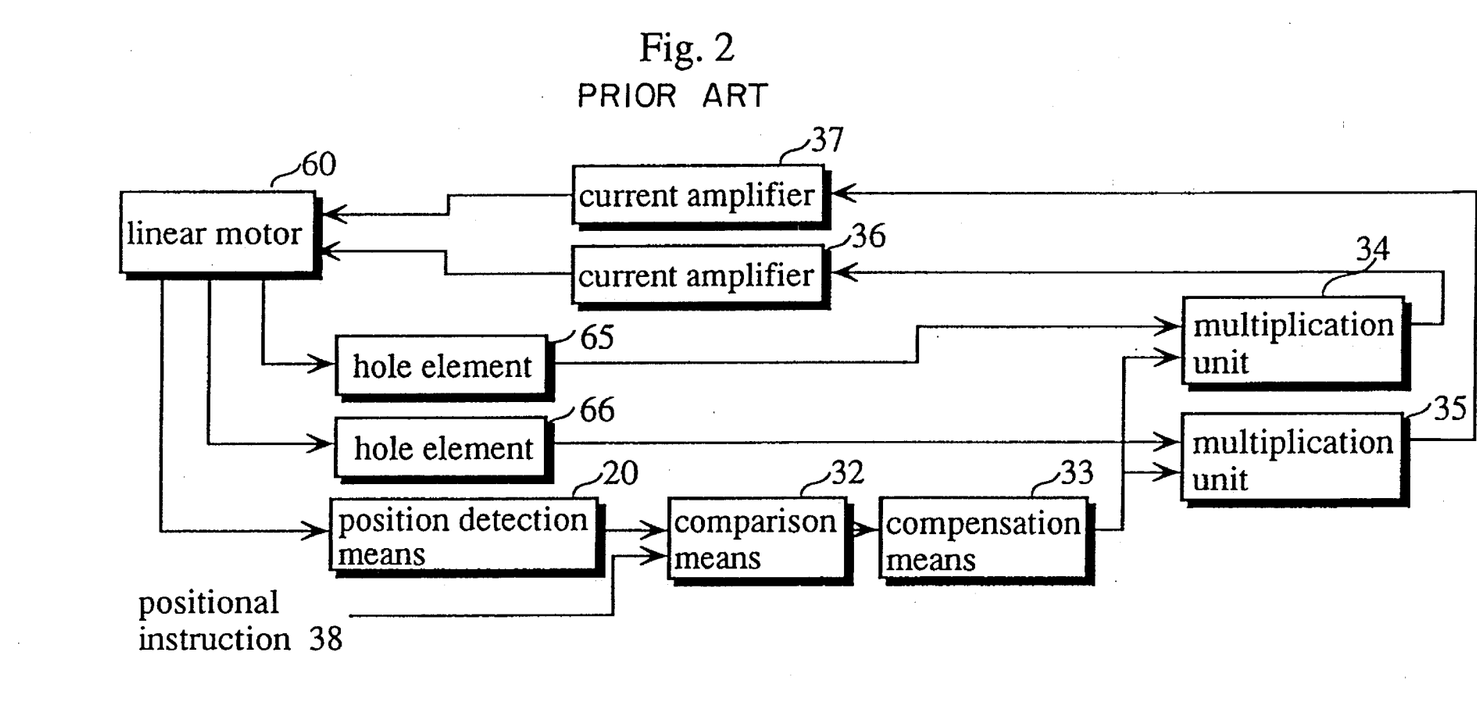
FIG. 2 is a block diagram showing a driving circuit to drive the multipolar voice coil type linear motor shown in FIG. 1.

FIG. 2 is a block diagram showing a driving circuit to drive a multipolar voice coil type linear motor.

The position detection unit 20, which is composed of, for example, an optical encoder and a counter, detects the positions of the coils 63 and 64. The comparison unit 32 calculates the error between the positional instruction 38 which indicates the positions of the coils 63 and 64 and the current position detected by the position detection unit 20.

The compensation unit 33 performs stability compensation or deviation compensation for the positional error calculated by the comparison unit 32, thereby generating a driving force instruction. The multiplication units 34 and 35 multiplies the magnetic flux detected with the hole elements and the driving force instruction generated by the compensation unit 33 in order to generate current instructions to supply to the coils 63 and 64. The current amplifiers 36 and 37 apply the current instruction generated by the multiplication units 34 and 35 to the linear motor 60 by amplifying current. Consequently, the coils 63 and 64 are moved by giving driving force in order to match the position to be detected by the position detection unit 20 and the positional instruction 38. The magnetic head can be located on a desired track by moving it together with the coils 63 and 64 by such a driving circuit.

However, when a multipolar voice coil type linear motor having hole elements is used as a head driving device, there are following problems.

More components are needed because of the provision of hole elements.

Since the outputs from the hole elements are analog, it is impossible to directly perform digital process.

The hole elements have different sensitivity, temperature characteristics, and also they change as time passes. These features directly affect the torque, and consequently, an adjustment for optimizing the driving circuit is needed.

The hole elements are originally used to detect the magnetic field to be formed by a permanent magnet; however, they tend to mistakenly detect the magnetic field to be generated by the coils because they are disposed in the vicinity of the coils. Such a miss operation tends to be caused especially during an access to a track, because a large amount of current is supplied to the coils. In addition, the S/N ratio of the hole elements deteriorates when a positioning operation is controlled, and as a result, the accuracy of the positioning operation is deteriorated.

It is possible to dispose the hole elements away from the coils to solve these problems; however, it prevents the device from being minimized.

SUMMARY OF THE INVENTION

The object of the present invention is to provide a head driving device which is thin, compact, inexpensive, easy to control, and demands low power consumption.

The object can be achieved by a head driving device comprising the following units:

A carriage having a head for recording or reproducing data onto a data recording medium, the carriage being capable of moving in a straight line;

A linear motor including a plurality of coils, a multipolar magnet, and a stator yoke, the plurality of coils being fixed on the carriage and shifted from each other in a moving direction of the carriage, the polarities of the multipolar magnet being alternated along a passage for the plurality of coils, and the stator yoke being ferromagnetic and fixing the multipolar magnet;

A position detection unit for detecting a position of the carriage; and

A driving circuit for supplying driving current to the plurality of coils, the driving circuit including a function generation unit and a current calculation unit, the function generation unit generating function signals for each coil, each of the function signals corresponding to a detected position of the carriage, based on a dispersion of magnetic flux to be generated by the multipolar magnet and the current calculation unit calculating current to be supplied to the plurality of coils, based on the function signals.

The driving circuit may include an operational signal generation unit for generating operational signals, based on a position detected by the position detection unit, and the current calculation unit may calculate an amount of current to be supplied to the plurality of coils by multiplying the operational signal generated by the operational signal generation unit and the function signal generated by the function generation unit.

The operational signal generation unit may generate the operational signals based on a positional error between the position detected by the position detection unit and a desired position.

The multipolar magnet may be disposed along the passage for the plurality of coils so that the magnetic flux forms an approximate sine wave.

The multipolar magnet may be composed of a plurality of unipolar magnetic elements, and a width W of the unipolar magnetic elements and a distance D between adjacent unipolar magnetic elements may be in a relation of $0.4 W \leq D \leq 0.6 W$.

The function generation unit may generate a function signal of either a sine function or a cosine function.

The number of the plurality of coils may be two, and phases of the two coils may be shifted from each other by $(90+180 \times n)°$, n being an integer, against the sine wave magnetic field, and the function generation unit may generate two function signals for the sine function of one coil and the cosine function of the other coil.

The two coils may be disposed so that effective portions of the two coils are located on the passage and that the phases of the two coils are overlapped in a manner that the two coils are shifted from each other by 90°, and a non-effective portion of at least one of the coils is bent in a direction away from the passage.

There may be two multipolar magnets which are disposed symmetrically on both sides of the passage.

The multipolar magnet may be disposed so that the dispersion of the magnetic flux forms a rectangle wave along the passage, and the function generation unit generates function signal in the form of a rectangular wave.

The function generation unit may have a table which is formed based on the dispersion of the magnetic flux and in which a position of the carriage is made to correspond to the functions of each coil, and the function generation unit may further read out a function in the table corresponding to the position signal sent from the position detection unit, and generate a function signal based on the function.

The position detection unit may include an optical encoder having a plurality of slits, and a counter for counting signals from the encoder.

The position detection unit may be an incremental type detection unit for detecting the relative moving amount of the carriage, and have a carriage positioning unit for positioning the carriage to a reference position when the head driving device is started.

The position detection unit may be an incremental type detection unit for detecting relative moving amount of the carriage, and the head driving device may further comprise the following units:

A second sensor for generating signals indicating that the carriage has reached the reference position, and A second driving circuit provided with a phase control unit for controlling phases of the function signals to be generated by the function generation unit, and a second current amount calculation unit for calculating an amount of current to be supplied to the plurality of coils, based on the phase-controlled function signals.

According to the head driving device constructed as described above, the position detection means detects the position of the carriage. Since the plurality of coils are fixed on the carriage, the position detection means can detect the positions of the coils, too.

The polarities of the plurality of magnets are alternated along the passage for the coils, the direction of the magnetic field to be formed by these magnets is alternated in accordance with the moving direction of the coils.

The function generation means generates a function signal for each coil, which is made to correspond to the position of the carriage detected by the position detection means, based on the dispersion of the magnetic flux to be formed by the multipolar magnets.

The current calculation means calculates the amount of current to be supplied to the plurality of coils, based on the function signal generated by the function generation means. As soon as the calculated current is supplied to the coils, the coils have a driving force, which drives the carriage.

Thus, the head can be moved in a desired direction without providing hole elements by supplying to the coils current in accordance with the dispersion of the magnetic flux, based on the results detected by the position detection means.

BRIEF DESCRIPTION OF THE DRAWINGS

These and other objects, advantages and features of the invention will become apparent from the following description there of taken in conjunction with the accompanying drawings which illustrate a specific embodiment of the invention. In the drawing.

DESCRIPTION OF THE PREFERRED EMBODIMENTS

EMBODIMENT 1

The head driving device of this embodiment will be described hereinafter with reference to the attached drawings.

Figure 3:
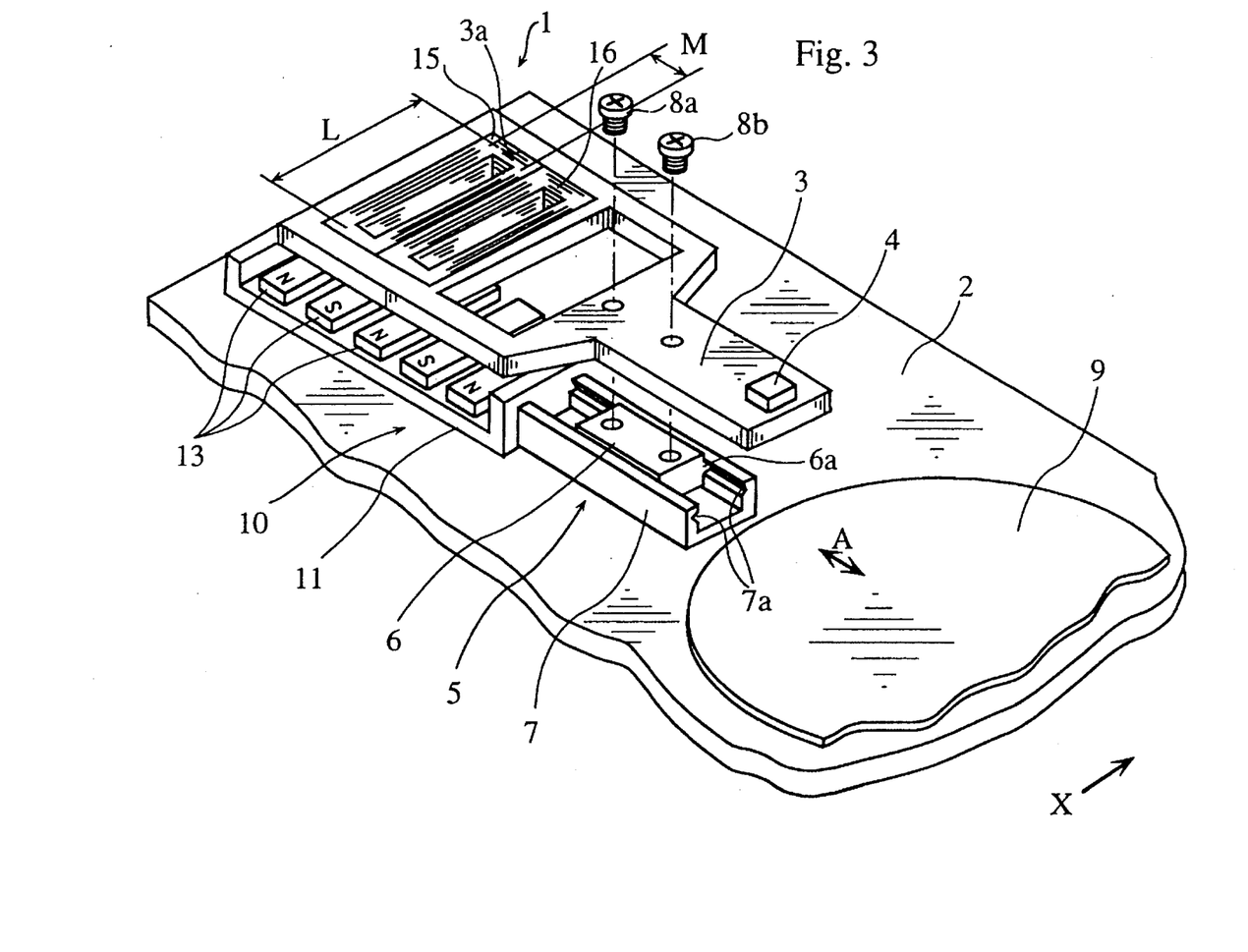
FIG. 3 shows the perspective view of the main part of the head driving device of the first embodiment.
Figure 4A:
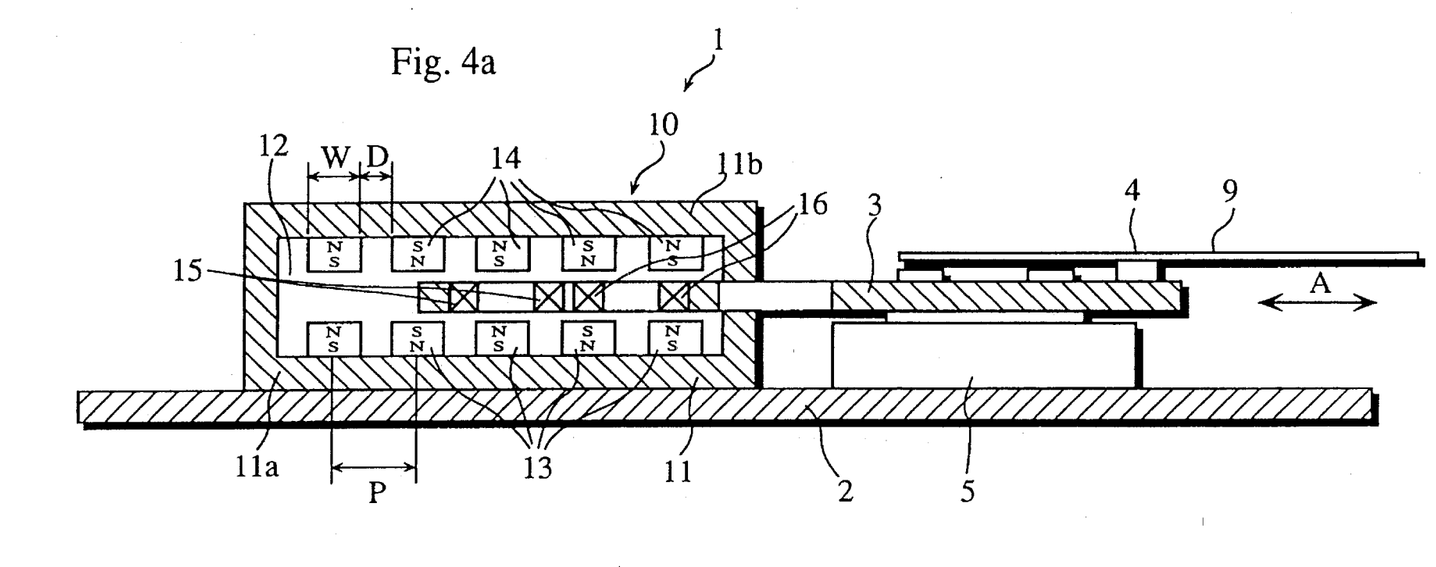
FIG. 4(a) shows a sectional view of the main part seem from the direction of the arrow X.

FIG. 3 shows the perspective view of the main part of the head driving device of this embodiment. FIG. 4(a) shows a sectional view of the main part seem from the direction of the arrow X.

The head driving device 1 is composed of a horizontally disposed base 2, a multipolar voice coil type linear motor 10 placed on the base 2, a carriage 3 which is driven by the linear motor 10 in the horizontal direction indicated by the arrow A (hereinafter A direction), a magnetic head 4 fixed on the carriage 3, a linear guide 5 for guiding the carriage 3, a position detection unit 20 (not shown in FIGS. 3 and 4) for detecting the position of the carriage 3, and a driving circuit 30 (not shown in FIGS. 3 and 4). The floppy disk 9 which rotates in the horizontal direction is sought by driving the magnetic head 4 in the A direction.

The linear motor 10 is composed of a stator yoke 11 fixed on the base 2, multipolar magnets 13 and 14 disposed on the stator yoke 11, and the coils 15 and 16. The upper part of the stator yoke 11 and the multipolar magnets 14 are not shown in FIG. 3.

The vertical section of the stator yoke 11 in the A direction forms a rectangular frame as shown in FIG. 4, and a space 12 is formed between the lower surface 11a and the upper surface 11b. One end of the carriage 3 (left end in FIG. 4) is inserted into the center of the space 12.

The multipolar magnets 13 consist of several unipolar bar magnets (five magnets in this embodiment). The longitudinal direction of each bar magnet is set in the direction vertical to the A direction (hereinafter left-right direction), and they are aligned at a fixed pitch P in the A direction on the surface 11a. Each bar magnet has N pole and S pole in the vertical direction, and adjacent magnets are disposed so that their N pole and S pole are in the opposite direction.

The multipolar magnets 14, which have the same construction as the multipolar magnets 13, are aligned on the surface 11b. These multipolar magnets 13 and 14 are disposed so that the N pole of a magnet on one surface faces the S pole of a respective magnet on the other surface.

A magnetic field is formed in the A direction in the center of the space 12 of the stator yoke 11 (which becomes the passage for the coils 15 and 16) between the multipolar magnets 13 and 14. The magnetic flux in the magnetic field is changed at a double period of the pitch P.

According to this embodiment, the width of each bar magnet in the A direction and the distance D between adjacent bar magnets are set to be $0.4\,W \leq D \leq 0.6\,W$, so that the magnet flux to be formed in the center of the space 12 forms a sine-wave in the A direction.

Figure 4B:
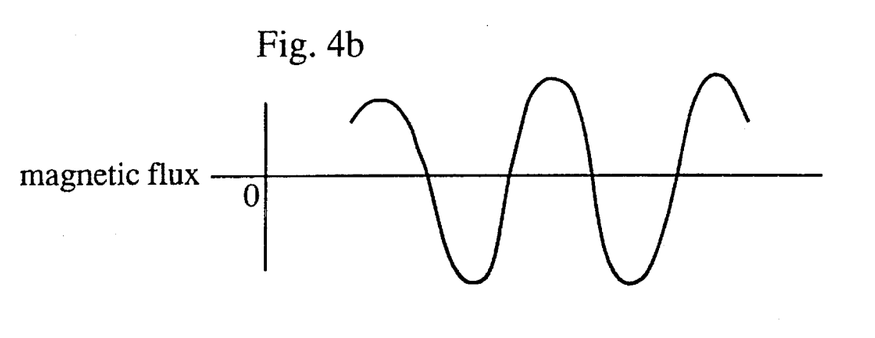
FIG. 4(b) shows the distribution of the magnetic flux in the magnetic field to be formed in the center of the space 12 by the multipolar magnets 13 and 14.

FIG. 4(b) shows the distribution of the magnetic flux in the magnetic field to be formed in the center of the space by the multipolar magnets 13 and 14. The period of the sine-wave is twice as long as the pitch P. As a result, the maximum amplitude of the sine-wave matches the center position of the bar magnet.

Figure 5:
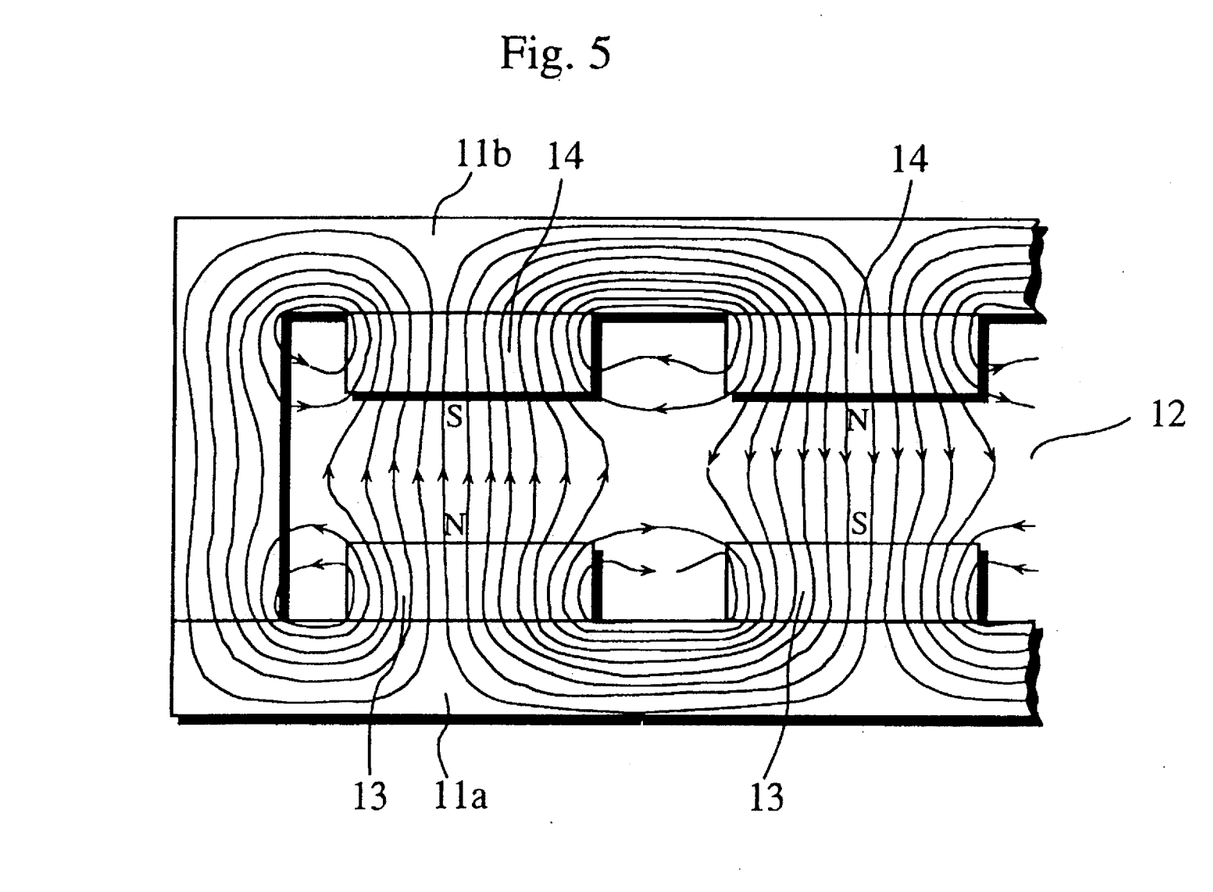
FIG. 5 shows a magnetic flux of the magnetic field to be formed by the multipolar magnets 13 and 14.

FIG. 5 shows the magnetic flux in the magnetic field to be formed by the multipolar magnets 13 and 14. The magnetic flux does not increase in accordance with the increase in the number of bar magnets because adjacent bar magnets have a closed magnetic circuit therebetween. Consequently, it is possible to increase the driving distance of the linear motor 10 without increasing the thickness of the stator yoke 11.

Since the multipolar magnets 13 and 14 are disposed to be vertically symmetrical so that the magnetic field to be formed between the multipolar magnets 13 and 14 are vertically symmetrical about the center of the space 12. As a result, the components of the magnet flux in the A direction are reversed around the center of the space 12. The electromagnetic forces in the vertical direction to affect the coils 15 and 16 are drawn each other in the center of the space 12 by the components in the A direction.

Consequently, the coils 15 and 16 are affected only by the force in the A direction, so that no undesired vibration is generated. This allows the highly accurate positioning control of the linear motor 10.

As shown in FIG. 3, the carriage 3 is disposed in parallel with the base 2. One end of the carriage 3 which is inserted in the linear motor 10 is wider and provided with a window 3a to attach the coils 15 and 16 thereon. The other end of the carriage 3 is narrower and provided with a magnetic head on its edge.

The linear guide 5 is composed of a moving unit 6 having a guide groove 6a and a fixed unit 7 having a guide groove 7a. The fixed unit 7 is fixed on the base 2. Several rotatable balls are held between the guide grooves 6a and 7a. The engagement of the guide grooves 6a and 7a allows the rotatable unit 6 to move only in the A direction. The carriage 3 can also move in the A direction only because it is fixed with the vises 8a and 8b.

Each of the coils 15 and 16 is a rectangular frame having a predetermined winding pitch M in the A direction and a predetermined effective width L in the left-right direction. The frames are fixed in the window 3a of the carriage 3 in the A direction. Consequently, the coils 15 and 16 can be moved as a body with the carriage 3 through the center of the space 12 of the linear motor 10. The coils 15 and 16 are shifted from each other in the A direction by $3*P/2$ (hereinafter an asterisk * indicates a multiplication operation).

It is possible to improve the utility efficiency of the coils by increasing the effective length of the coils to their entire lengths by increasing the effective length L of the coils 15 and 16 to the winding pitch M.

Figure 6:
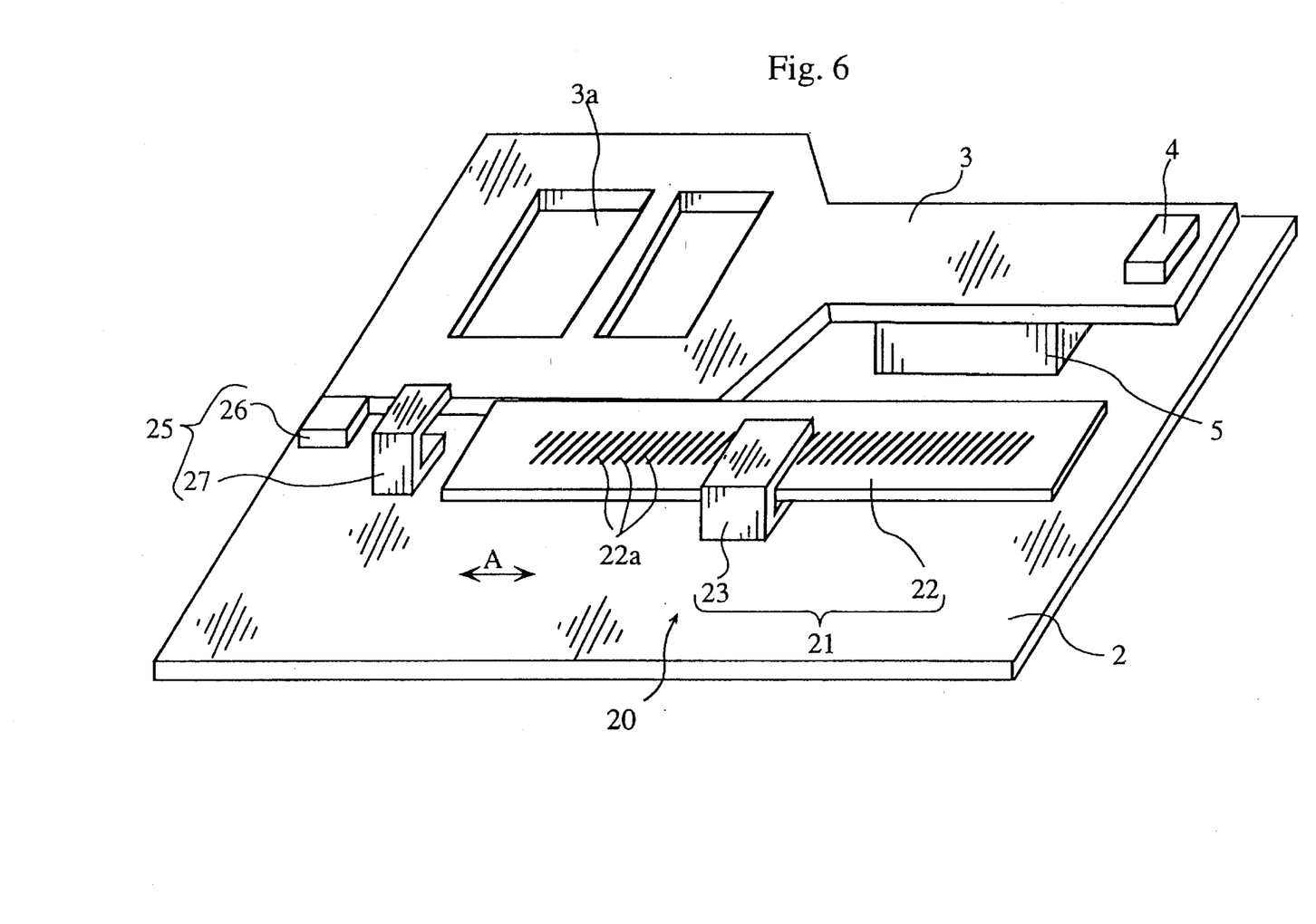
FIG. 6 is a perspective view of the construction of the position detection unit 20.

FIG. 6 is a perspective view of the construction of the position detection unit 20. In the construction, the linear motor 10 is omitted. The position sensor 25 in the construction is used in the second embodiment, but not in this embodiment.

Figure 7:
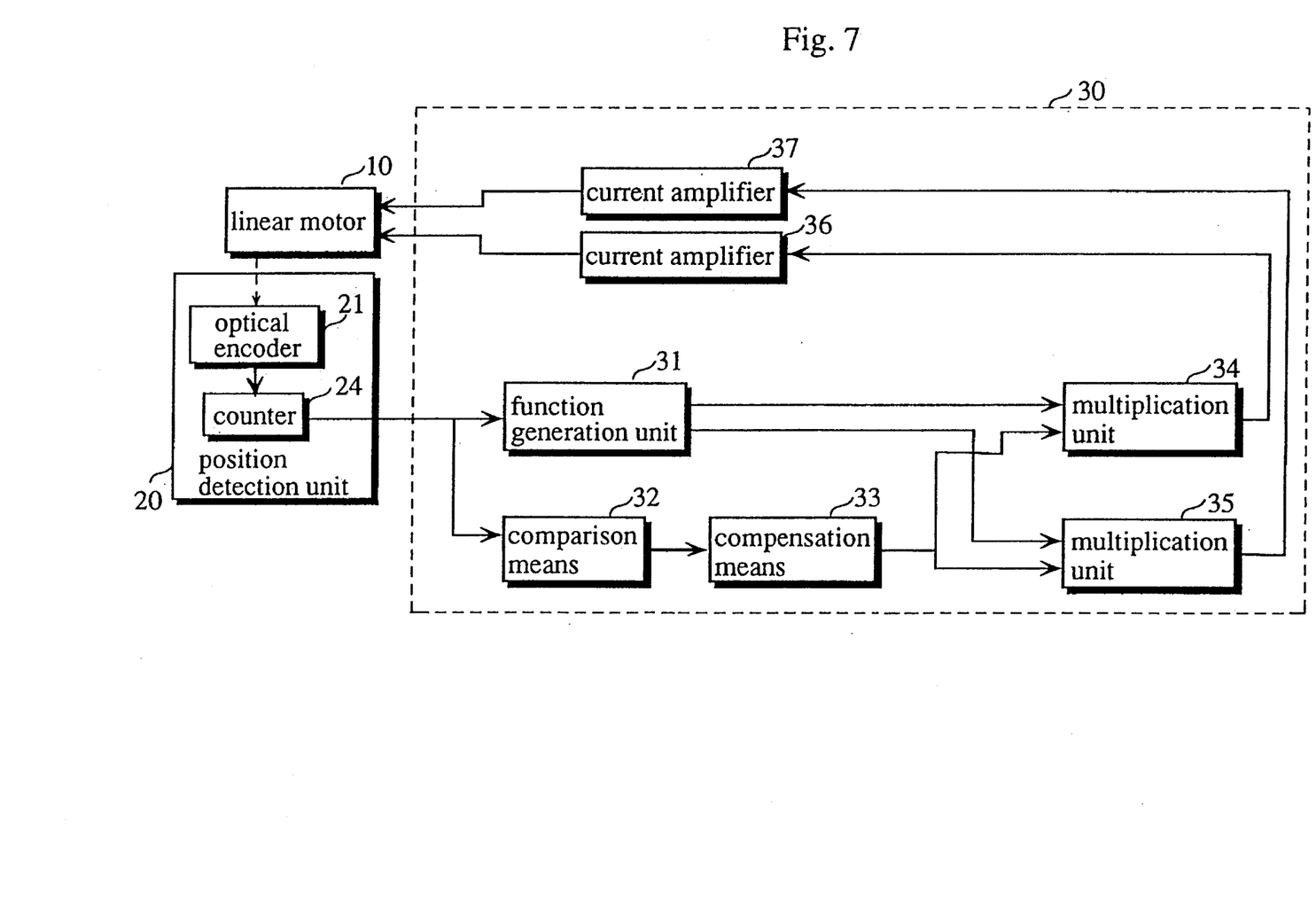
FIG. 7 is a block diagram showing the construction of the driving circuit 30.

The position detection unit 20, which is an incremental type position sensor, is composed of an optical encoder 21 having a move unit 22 fixed on the carriage 3 and a fixed unit 23 fixed on the base 2, and a counter 24 shown in FIG. 7.

The move unit 22 is a stainless plate having slits 22a which have been etched at an equal interval in the A direction. When the slits must be finer, they can be evaporated onto a glass board.

The fixed unit 23, which can be an optical-electric sensor provided with a light emitter and a light receiver, generates a pulse signal by reading the slit 22a when the slit 22a passes by the fixed unit 23 in accordance with the movement of the carriage 3 (Some detecting systems have a position sensor which can generate a plurality of pulse signals among the slits). By counting the pulse signals with the use of the counter 24, a position signal to indicate the position of the carriage 3 on the base 2 in the A direction is sent as a digital signal (refer to FIG. 7).

When a position sensor of an incremental type is used as the position detection unit 20, unless the carriage 3 is fixed in a certain position when the power is turned on, the start point of the counting operation of the counter 24 can not be determined, and the absolute position of the carriage 3 cannot be detected. For this reason, an unillustrated positioning mechanism is provided to mechanically position the carriage 3 on a predetermined reference position. The carriage 3 is positioned to the reference position by the positioning mechanism when the power is turned on, and the counter 24 starts counting from the reference position. The positioning mechanism positions the magnetic head, for example, on the innermost or outermost track on the floppy disk 9.

The coils 15 and 16 and the magnetic head 4 are fixed on the carriage 3, and the multipolar magnets 13 and 14 are fixed on the base 2. Consequently, the position detection unit 20 can detect the relative positions of the coils 15 and 16 to the multipolar magnets 13 and 14, and the relative position of the magnetic head 4 to the base 2.

FIG. 7 is a block diagram showing the construction of the driving circuit 30. The driving circuit 30 is composed of the following units:

A function generation unit 31 generates a sine function and a cosine function based on a positional signal detected by the position detection unit 20.

A comparison unit 32 calculates the positional error between the position of the magnetic head 4 detected by the position detection unit 20 and the position indicated by the positional instruction 38.

A compensation unit 33 finds a driving force instruction by calculating compensation (stability compensation or deviation compensation) for the positional error calculated by the comparison unit 32.

Multiplication units 34 and 35 generate current instructions by multiplying the sine function and the cosine function found by the function generation unit 31 and the driving force instruction generated by the compensation unit 33.

Current amplifiers 36 and 37 output driving current to the linear motor 10 by multiplying current instruction of the multiplication units 34 and 35.

The coils 15 and 16 of the linear motor 10 generate a driving force from the driving current to be supplied from the current amplifiers 36 and 37.

The principle of the controlling operation of the driving circuit 30 will be described as follows.

As described above, a magnetic field is formed in the space 12 of the linear motor 10. The magnetic flux in the magnetic field changes in the form of a sine wave in a period of 2×P in the A direction. Since the period corresponds to an electrical angle 2π, the positional error (3P/2) between the coils 15 and 16 in the A direction corresponds to an electrical angle 3π/2.

Thus, when the coil 15 is positioned in the relative position X (X is an electrical angle) to the multipolar magnets 13 and 14, the magnetic flux Ba in the coil 15 is expressed by the formula (1), and the magnetic flux Bb in the coil 16 is expressed by the formula (2).

$$Ba=B*\cos(X) \tag{1}$$

$$Bb=B*\cos(X+3\pi/2)=B*\sin(X) \tag{2}$$

(B is a maximum amplitude of the magnetic flux)

Here, it is assumed that the coil 15 is supplied current Ia shown in the formula (3) and the coil 16 is supplied current Ib shown in the formula (4) by the driving circuit 30.

$$Ia=f*\cos(X) \tag{3}$$

$$Ib=f*\sin(X) \tag{4}$$

(f is a constant)

Since the electro-magnetic force in proportion to the product of the magnetic flux and the current affects coils in the magnetic field, the coil 15 is affected by the electro-magnetic force Fa expressed by the formula (5), and the coil 16 is affected by the electro-magnetic force Fb expressed by the formula (6).

$$Fa=K*Ba*Ia=B*K*f*\cos^2(X) \tag{5}$$

$$Fb=K*Bb*Ib=B*K*f*\sin^2(X) \tag{6}$$

(K is a proportional coefficient)

The driving force F to affect the carriage 3 equals to the sum of Fa and Fb as shown in the formula (7).

$$F=Fa+Fb=B*K*f(\cos^2(X)+\sin^2(X))=B*K*f \tag{7}$$

In the formula 7, the driving force F is not the function of the position X, which indicates that the driving force F has no relation to the position X.

As shown in the formulas (3) and (4), current based on the cosine function and the sine function of the position X is supplied to the coils 15 and 16, and as a result, a driving force F shown in the formula (7) can affect the carriage 3.

In the formula (7), if the constant f is regarded as a variable, the driving force F is in direct proportion to the constant f. Thus, it is possible to control the driving force F to be linear by changing the constant f.

In the driving circuit 30, it is possible to control the driving force F for driving with regular torque by controlling the currents Ia and Ib as shown in the formulas (3) and (4) and by regarding the constant f as a current direction.

The control operation carried out in the driving circuit 30 will be described hereafter in accordance with such a principal.

The position detection unit 20 can detect the relative position X of the coil 15 to the multipolar magnets 13 and 14. Consequently, the function generation unit 31 generates the cosine function cos(X) and the sine function sin (X) shown in the formulas (3) and (4) in accordance with the relative position X detected by the position detection unit 20. The cosine function and the sine function respectively correspond to the coils 15 and 16. The generated function signals are sent to the multiplication units 34 and 35.

Since the position detection unit 20 can obtain the positional signal of the carriage 3 as a digital signal, the sine function and the cosine function can be easily obtained by forming the tables of the sine and cosine functions having the positional signals as address information in ROM (Read Only Memory, not shown).

The positional instruction 38 to be inputted to the comparison unit 32 indicates a desired position of the magnetic head 4. The comparison unit 32 finds the positional error between the position of the magnetic head 4 detected by the position detection unit 20 and the desired position indicated by the position instruction 38.

The compensation unit 33 finds the current indication f by applying compensation calculation (stability compensation or deviation compensation) to the positional error calculated by the comparison unit 32, and outputs it to the multiplication units 34 and 35.

The multiplication units 34 and 35 multiplies the function signal (cosine function and sine function) to be sent from the function generation unit 31 and the current instruction f, and then outputs the result to the current amplifiers 36 and 37. The current amplifiers 36 and 37 generate the current Ia and Ib shown in the formulas (3) and (4), based on the result sent from the multiplication units 34 and 35.

When the current instruction f is in the form of an analog signal, the multiplication units 34 and 35 can be easily constructed with a multiplication type D/A converter. Whereas the current instruction f is in the form of a digital signal, they can be easily realized by software with the use of CPU.

Thus, the driving current to the coils 15 and 16 are controlled by the driving circuit 30. Then, the driving force in proportion to the current instruction f is generated in the carriage 3, and the magnetic head 4 is positioned to the desired position indicated by the positional instruction 38.

Effects of the Head Driving Device of this Embodiment

According to the head driving device 1 of this embodiment, the comparison unit 32 calculates the positional error based on the positional information sent from the position detection unit 20, without using hole elements in the linear motor 10. In addition, the driving current is supplied to the linear motor 10, based on the positional error and the function signal generated by the function generation unit 31, thereby positioning the magnetic head 4.

There is no mis-operation caused by the driving current to be supplied to the coils like in the case where hole elements are used, and there is no deterioration of the S/N ratio. Consequently excellent control can be obtained, and the adjustment of the driving circuit can be easily done.

Since the position signal to be outputted from the position detection unit 20 is a digital signal, no A/D conversion is necessary for the digital process in the driving circuit 30.

The position sensor can be absolute type or incremental type. Since the former is generally more expensive, incremental type position sensor is used in this embodiment, and a positioning mechanism is provided for mechanically positioning the carriage 3 when the head driving device is started.

The use of an absolute type position sensor allows the detection of the absolute position from the start, no positioning mechanism is necessary.

EMBODIMENT 2

Figure 8:
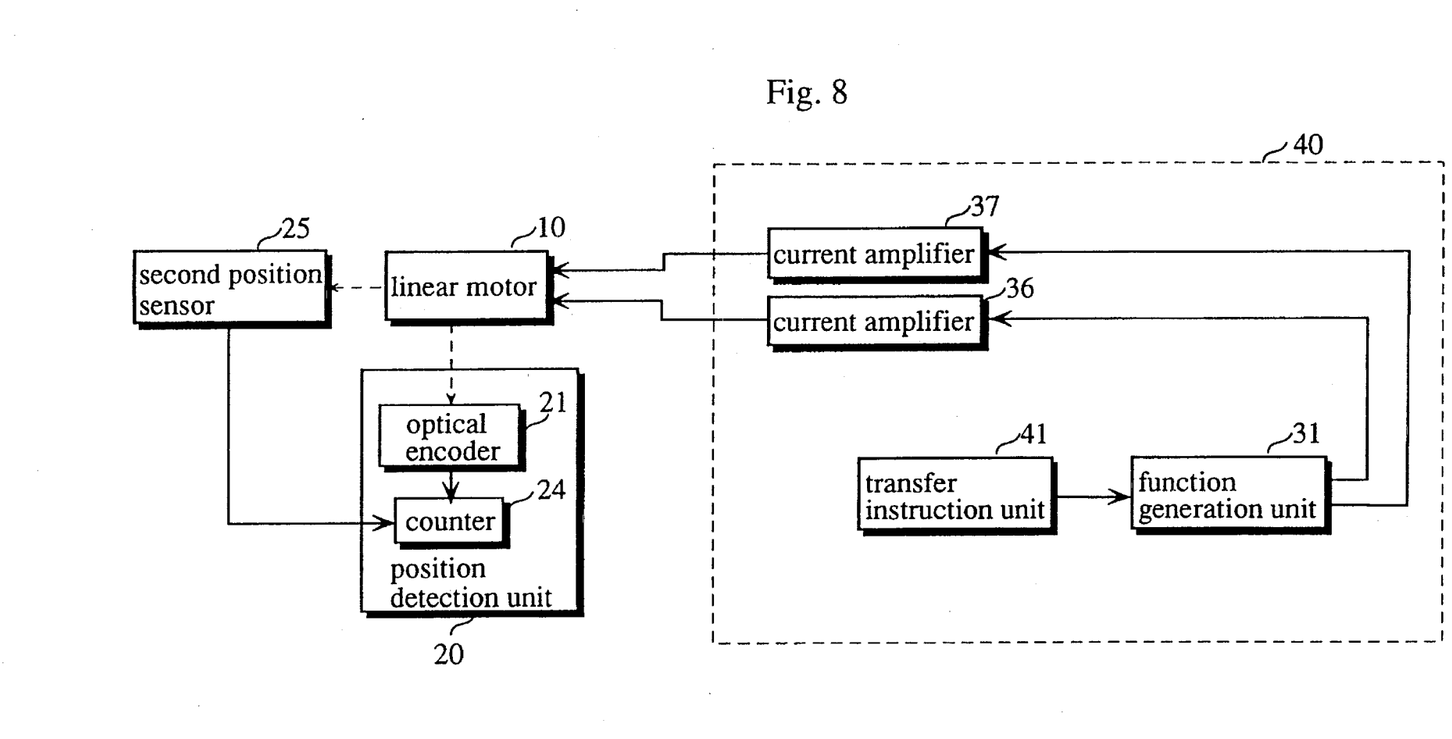
FIG. 8 is a block diagram showing the construction of the driving circuit 40 when the head driving device of the second embodiment is started.

The head driving device of this embodiment is different from that of the first embodiment shown in FIG. 3 in that the second position sensor 25 is provided as shown in FIG. 6 instead of the fixing mechanism of the carriage 3, and in that the driving circuit 40 shown in FIG. 8 is provided for starting in addition to the driving circuit 30 shown in FIG. 7. The like components in FIG. 8 are labeled with like reference numerals with respect to the first embodiment.

As shown in FIG. 4, the second position sensor 25 is composed of a transfer unit 26 consisting of a photo interrupter and a fixed unit 27 consisting of a photo sensor. The transfer unit 26 is fixed on the carriage 3, and the fixed unit 27 is fixed on the base 2. When the carriage 3 reaches a predetermined reference position, the fixed unit 27 detects the transfer unit 26, and generates a signal. This type of sensor is generally used as a zero track sensor for detecting the start point of the track in a floppy disk.

In the driving circuit 40 for starting, the function generation unit 31 generates sine functions and cosine functions by using the function tables of the sine wave and cosine wave prepared in the ROM as described in the first embodiment. The current amplifiers 36 and 37 supply driving current to the linear motor 10 according to the sine functions and the cosine functions generated by the function generation unit 31. The transfer instruction unit 41 controls the phase of the sine and cosine functions.

In this embodiment, the magnetic head 4 is transferred by using the driving circuit 40 when the head driving device is started.

Since the position sensor to be used in this embodiment is incremental type like in the first embodiment, so that the start point from which the counter 24 starts counting becomes an issue. Therefore, the carriage 3 is transferred when the head driving device is started, and as soon as the second position sensor 25 generates a signal, the counter 24 is set to a predetermined value, which is made the start point.

However, the driving circuit 30 cannot be used until the start point of the counter 24 is set, so that the driving circuit 40 is used to transfer the carriage 3 for starting in this embodiment. After the start point of the counter 24 is set, the magnetic head 4 is positioned in the same manner as in the first embodiment by operating the driving circuit 30.

Then, in the driving circuit 40, the phases of the sine and cosine functions to be generated by the function generation unit 31 are controlled by the transfer instruction unit 41. As a result, the carriage 3 is transferred in accordance with the following principle.

When the phases of the sine and cosine functions are made R, and the driving current Ia and Ib shown in the formulas (8) and (9) are assumed to be supplied to the coils 15 and 16.

$$Ia = IO^* \sin(R) \tag{8}$$

$$Ib = IO^* \cos(R) \tag{9}$$

(IO is a current wave high rate)

When the coil 15 is in the relative position X to the multipolar magnets 13 and 14, the magnetic flux Ba for the coil 15 is expressed by $B^*\cos(X)$, and the magnetic flux Bb for the coil 16 is expressed by $B^*\cos(X)$. As a result, the driving force F to the carriage 3 is expressed by the formula (10).

$$\begin{aligned} F &= K(Ba^*Ia + Bb^*Ib) \\ &= K(B^*\cos(X)^*IO^*\sin(R) - B^*\sin(X)^*IO^*\cos(R)) \\ &= K^*B^*IO^*(\cos(X)^*\sin(R) - \sin(X)^*\cos(R)) \\ &= K^*B^*IO^*\sin(X-R) \end{aligned} \tag{10}$$

The formula (10) indicates that the carriage 3 is going to move to the position where the driving force F becomes O (that is, X=R). However, due to the friction of the linear guide 5, the carriage 3 stays on the position which is shifted by the error ΔX from the position of X=R as shown in the formula (11).

$$X=\Delta X+R \quad (11)$$

When the change amount of R per unit time is made Rd and the starting point is made RO, then R=RO+Rd*t. Consequently, the position for the carriage 3 to stop is expressed by the formula (12)

$$X=\Delta X+RO+Rd*t \quad (12)$$

In the formula (12), RO is a constant, and ΔX can be regarded as a fixed value, which indicates that the carriage 3 transfers at the speed of Rd per unit time.

Thus, in the driving circuit 40, the function generation unit 31 generates sine and cosine functions, that is, sin (R) in the formula (8) and cos (R) in the formula (9). The transfer instruction unit 41 controls the phases R of the sine and cosine functions (R=RO+Rd*t). Then, the current amplifiers 36 and 37 generate currents Ia and Ib to be expressed by the formulas (8) and (9), in order to transfer the carriage 3 at the speed of Rd.

To be more specific, the transfer instruction unit 41 can control the phases R by incrementing the addresses of the function table in the function generation unit 31 at a certain time interval.

It is possible to provide a reference slit besides the slit 22a on the optical encoder 21, instead of providing the second position sensor 25, in order to make the point where the reference slit is read by the fixed unit 23 be the start point of counting.

EMBODIMENT 3

Figure 9:
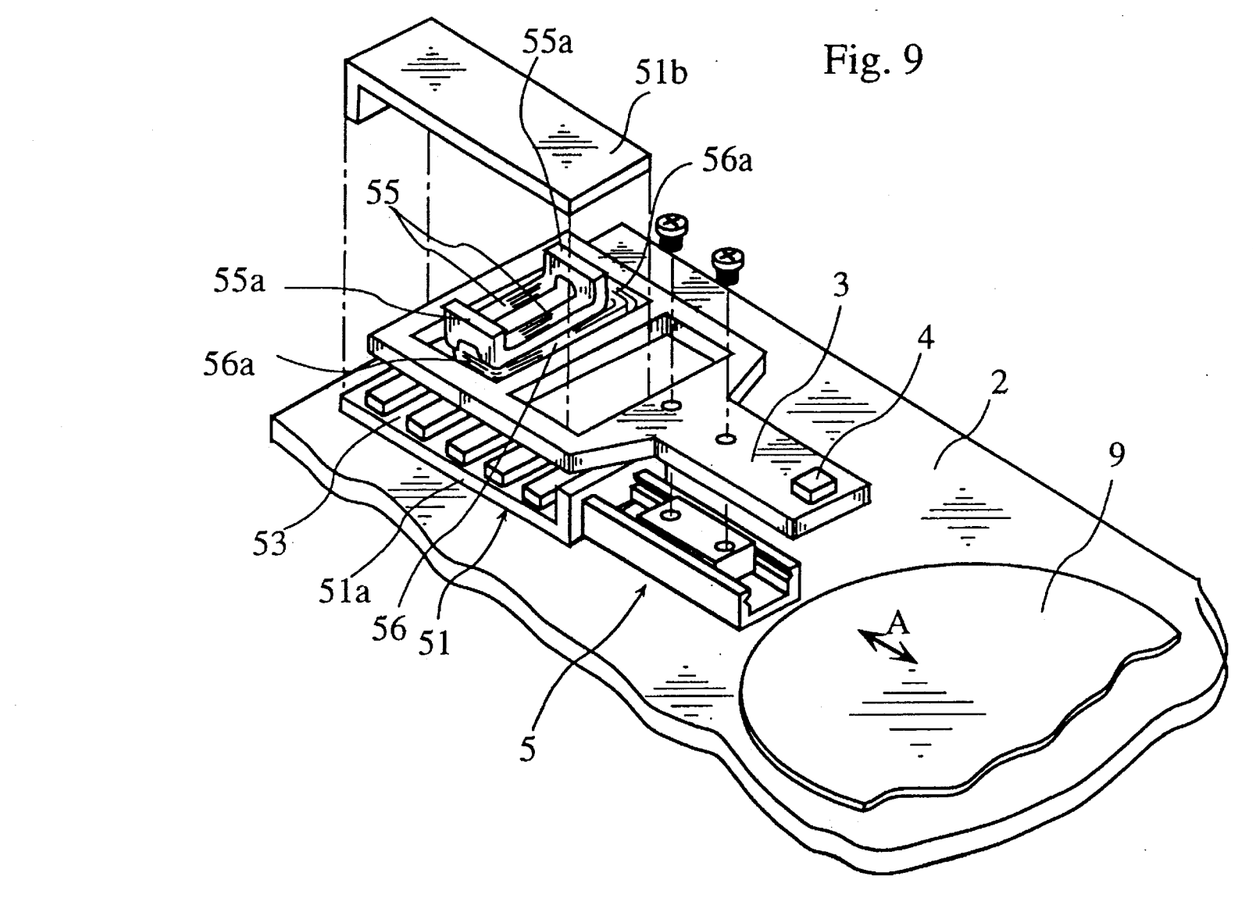
FIG. 9 is a perspective view of the discomposed construction of the head driving device of the third embodiment.
Figure 10:
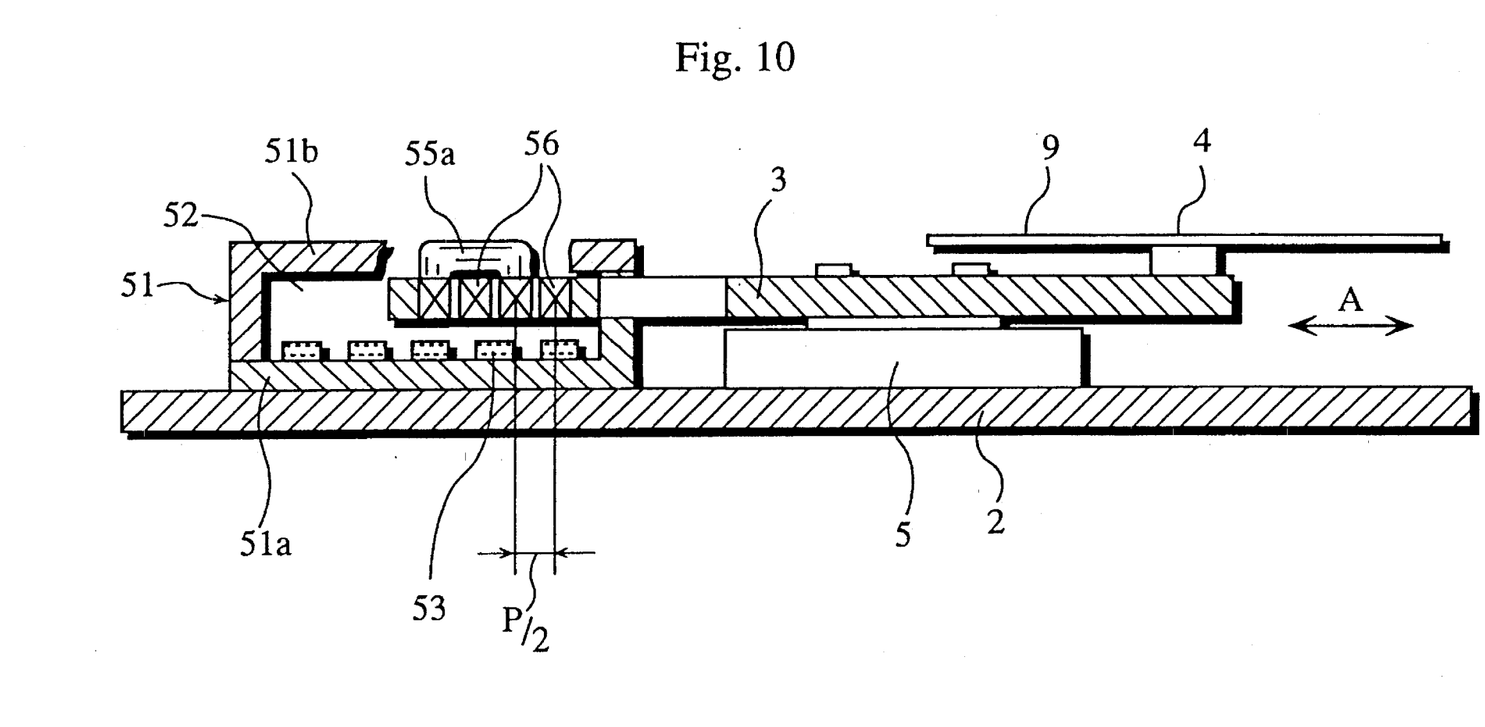
FIG. 10 is a sectional view of a side of the head driving device shown in FIG. 9.

The head driving device of this embodiment is different from that of the first embodiment in that the linear motor 50 having rearranged coils and multipolar magnets is used instead of the linear motor 10.

FIG. 9 is a perspective view of the discomposed construction of the head driving device of this embodiment, and FIG. 10 is a sectional view of a side of the head driving device. The like components in FIG. 10 are labeled with like reference numerals with respect to the first embodiment.

In the linear motor 50, the multipolar magnets 53 similar to the multipolar magnets 13 of the first embodiment are disposed on the lower surface 51a of the stator yoke 51; however, no multipolar magnets are disposed on the upper surface 51b of the stator yoke 51. The width of the upper surface 51b is slightly smaller than the width of both ends 55a of the coil 55, and the upper surface 51b is provided between the ends 55a.

Thus, even if the multipolar magnets 53 are disposed on one side, the space 52 in the stator yoke 51 has a magnetic field which indicates the dispersion of a sine-wave magnetic flux like in the first embodiment. However, unlike the case where the multipolar magnets 13 and 14 are oppositely disposed, the vertical electro-magnetic forces to the coils 55 and 56 cannot be negated each other.

In the linear motor 50, the coils 55 and 56 are disposed in the A direction by shifting from each other by p/2 (which corresponds to 90° as a phase, while the portion corresponding to the effective length L (the effective portion of the coils 55 and 56) are disposed on the same surface.

Although the coils 55 and 56 are the same as the coils 15 and 16 of the first embodiment, both ends 55a of the coil 55 (that is the non-effective part of the coils) are bent upward, so that the ends 55a are layered on the ends 56a of the coil 56. Thus, it is possible to make the distance between the coil 55 and the coil 56 short, in order to realize a compact linear motor 50.

The head driving device of this embodiment can be driven by the driving circuit 30, in the same manner as in the first embodiment.

Others

The multipolar magnets used in these embodiments 1–3 are composed of a plurality of unipolar bar magnets; however, a single multipolar magnet can be used instead.

The magnetic flux in the magnetic field formed in these embodiments 1–3 are distributed in the form of a sine wave. Even if the distance between the bar magnets are made shorter than 0.4 W, and as a result, the magnetic flux in the magnetic field forms a rectangle wave (a trapezoid wave), the function generation unit 31 can generate a rectangular wave function signal corresponding to the magnetic field.

Although the optical encoder 21 is used as the position detection unit 20 in these embodiments 1–3, a device which can detect a position of the carriage 3 such as a position sensor having MR elements can be used instead.

Although the linear motors in these embodiments 1–3 are provided with two coils, three coils can be used by letting the function generation means 31 generate three function signals.

Although the two coils are disposed by shifting from each other by a distance of 3P/2 or P/2 in the linear motor of these embodiments 1–3, the distance can be nP/2 (n is an odd number) instead.

These embodiments 1–3 describe the positioning of the head in the head driving device; however, the positioning can be applied to the track access control or tracking servo.

These embodiments 1–3 describe a device for driving the magnetic head, the device can be also used as a pick actuator for optical disks such as CD-ROM.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A head diving device comprising:

a carriage having a head for recording or reproducing data onto a data recording medium, said carriage being capable of moving in a straight line;

a linear motor including a plurality of coils, a pair of multipolar magnets, and a stator yoke, said plurality of coils being fixed on the carriage and shifted from each other in a moving direction of the carriage, polarities of said multipolar magnets being alternated along a passage for said plurality of coils, and said stator yoke being ferromagnetic and fixing said multipolar magnets, wherein said multipolar magnets are disposed symmetrically along both sides of the passage for said plurality of coils, one of the coils is positioned so that its phase is shifted from at least one of the other coils by 90 degrees and the resulting magnetic field wave is accordingly shifted, said multipolar magnets are composed of a plurality of unipolar magnetic elements, and a width W of the unipolar magnetic elements and a distance D between adjacent unipolar magnetic elements are in a relation of $0.4\,W \leq D \leq 0.6\,W$;

a position detection means for detecting a position of the carriage, and a driving circuit for supplying driving current to said plurality of coils, said driving circuit including a function generation means and a current calculation means, said function generation means generating function signals for each coil, each of said function signals corresponding to a detected position of the carriage, based on a dispersion of magnetic flux to be generated by said multipolar magnets and said current calculation means calculating current to be supplied to said plurality of coils, based on the function signals, wherein said driving circuit includes an operational signal generation means for generating operational signals, based on a position detected by said position detection means, and said current calculation means calculates an amount of current to be supplied to said plurality of coils by multiplying the operational signal generated by said operational signal generation means and the function signal generated by the function generation means, and said operational signal generation means generates the operational signals based on a positional error between the position detected by the position detection means and a desired position.

2. The head driving device of claim 1, wherein said function generation means generates a function signal of one of a sine function and a cosine function.

3. The head driving device of claim 1, wherein a number of said plurality of coils is two, and phases of the two coils are shifted from each other by $(90+180 \times n)°$, n being an integer, against the sine wave magnetic field, and said function generation means generates two function signals for the sine function of one coil and the cosine function of the other coil.

4. The head driving device of claim 3, wherein the two coils are disposed so that effective portions of the two coils are located on the passage and that the phases of the two coils are overlapped in a manner that the two coils are shifted from each other by 90°, and a non-effective portion of at least one of the coils is bent in a direction away from the passage.

5. The head driving device of claim 1, wherein there are two multipolar magnets which are disposed symmetrically on both sides of the passage.

6. The head driving device of claim 1, wherein said function generation means has a table which is formed based on the dispersion of the magnetic flux and in which a position of the carriage is made to correspond to the functions of each coil, and said function generation means further reads out a function in the table corresponding to the position signal sent from the position detection means, and generates a function signal based on the function.

7. The head driving device of claim 1, wherein said position detection means includes an optical encoder having a plurality of slits, and a counter for counting signals from the encoder.

8. The head driving device of claim 1, wherein said position detection means is an incremental type detection means for detecting the relative moving amount of the carriage, and has a carriage positioning means for positioning the carriage to a reference position when the head driving device is started.

9. The head driving device of claim 1, wherein said position detection means is an incremental type detection means for detecting relative moving amount of the carriage, and the head driving device further comprising:

a second sensor for generating signals indicating that the carriage has reached the reference position, and a second driving circuit provided with a phase control means for controlling phases of said function signals to be generated by said function generation means, and a second current amount calculation means for calculating an amount of current to be supplied to said plurality of coils, based on the phase-controlled function signals.

* * * * *